May 26, 1970   J. F. KUEBLER   3,514,586
COUNTERBALANCING SYSTEM, PARTICULARLY FOR STAGE LIGHTING
Filed Oct. 2, 1967   2 Sheets-Sheet 1

INVENTOR.
James F. Kuebler
BY
Curtis, Morris & Safford
ATTORNEYS

May 26, 1970 J. F. KUEBLER 3,514,586
COUNTERBALANCING SYSTEM, PARTICULARLY FOR STAGE LIGHTING
Filed Oct. 2, 1967 2 Sheets-Sheet 2
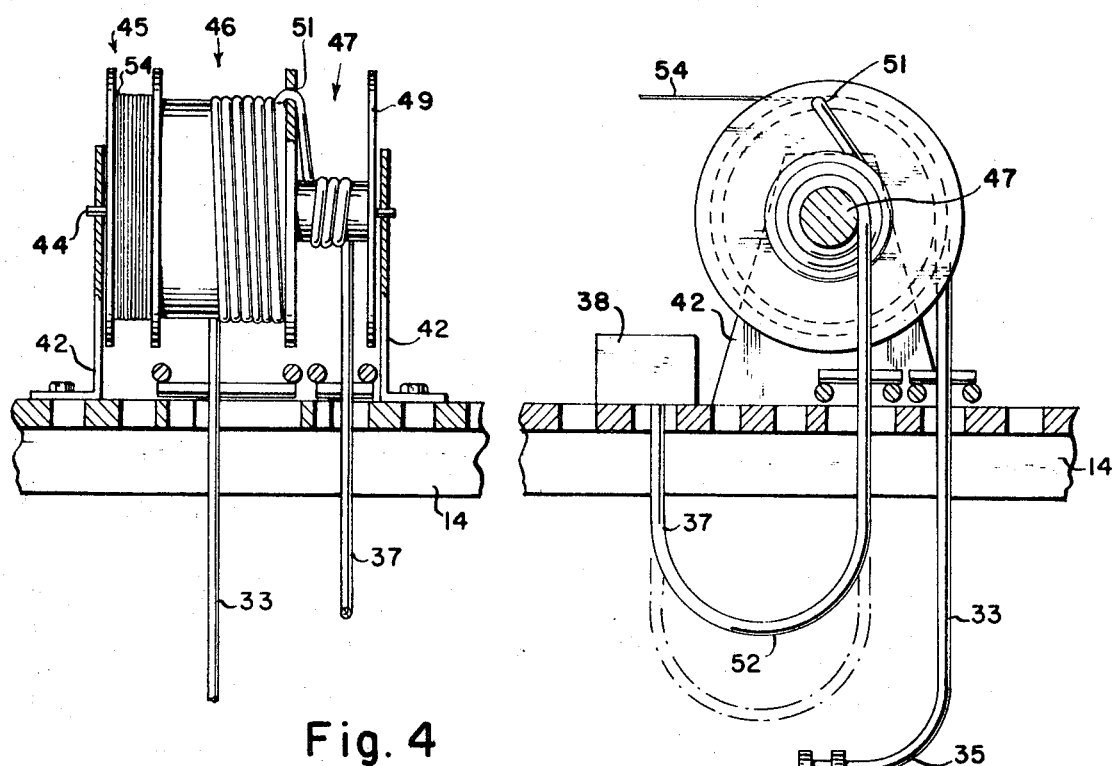
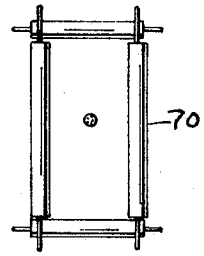
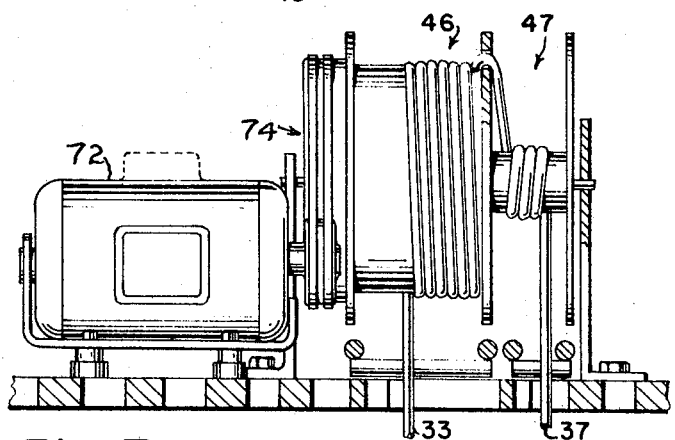
INVENTOR.
James F. Kuebler
BY
Curtis, Morris & Safford
ATTORNEYS

United States Patent Office 3,514,586
Patented May 26, 1970

3,514,586
COUNTERBALANCING SYSTEM, PARTICULARLY FOR STAGE LIGHTING
James F. Kuebler, Tiffin, Ohio 44883
Filed Oct. 2, 1967, Ser. No. 672,145
Int. Cl. F21p 5/00
U.S. Cl. 240—3                                                5 Claims

ABSTRACT OF THE DISCLOSURE

A stage lighting system having a light batten with a counterbalancing system. The electric cable to the light batten is wound on a reel assembly having two cable-winding reel portions mounted to rotate together. The two reel portions are spirally wound in opposite directions to enable simultaneous unwinding or winding of the two ends of the cable.

---

Figure 1:
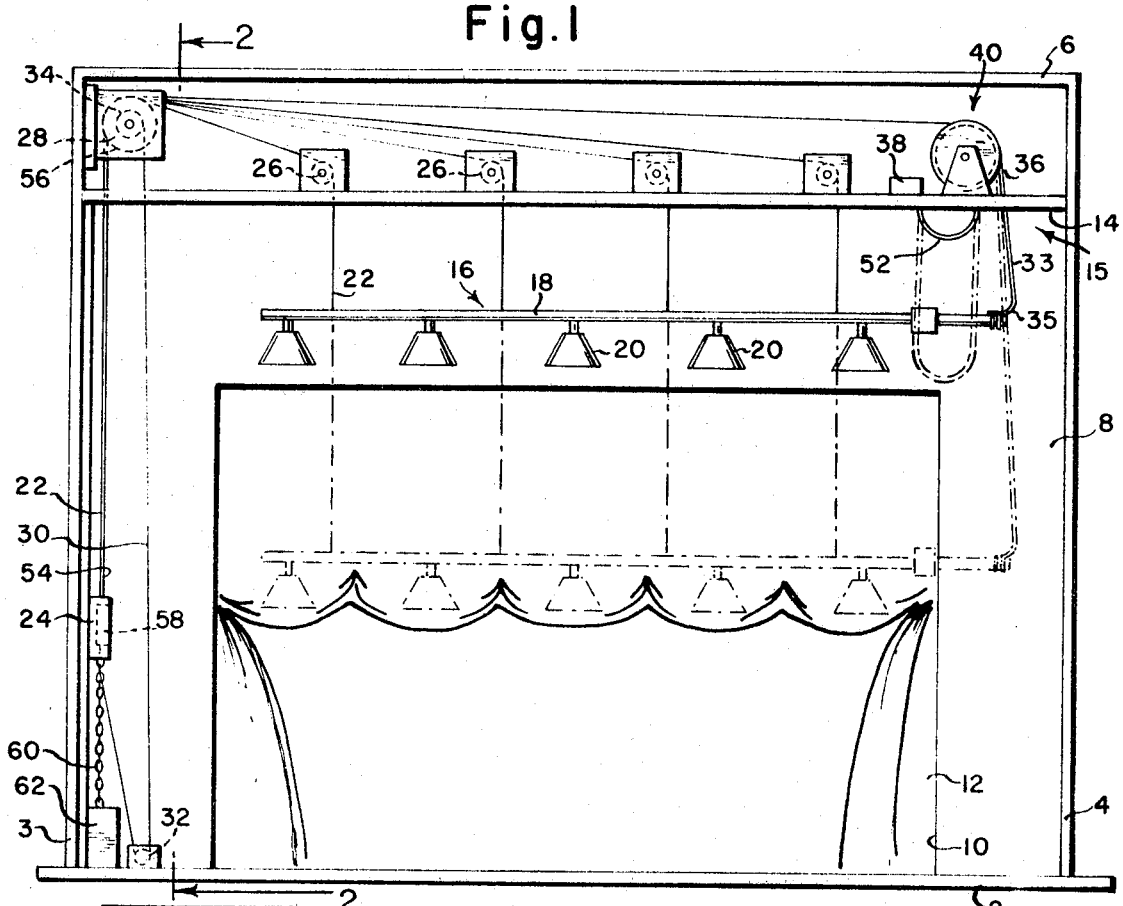

This invention relates to stage lighting, and more in particular to automatic cable reel systems that are adapted to meet the requirements in such fields as stage lighting.

There are many situations in which a cable extends between two units that, as a result of the motion of one or both of them, are separated by varying distances. A typical situation is one in which the electric feed cable extends between and connects the lighting units with the fixed electric junction box and the lighting unit is moved. It is frequently desirable, in such situations, to provide an automatic means that takes up slack in the cable and still does not interfere with the motion of the units. A concrete example from the field of theatrical lighting will serve to illustrate the problems that arise and the means by which the present invention solves them: A device that is frequently employed in stage lighting is the lighting batten, an assembly containing several electric lights and hanging directly above the stage, just out of sight of the audience. Battens are hung and counterweighted in such a way that they may be raised or lowered, as circumstances may require. One of the principal difficulties arising from the use of lighting battens is that of supplying electrical current to the lights. In many cases, the complexity of the lighting circuits necessitates the use of heavy cables containing many electric wires or conductors. In the past, the usual practice has been to run a cable directly from the batten to a junction box located overhead on or near the stage ceiling. One disadvantage of that practice is that the cable must be carefully arranged so that it will not loop down and be visible to the audience, and so that it does not interfere with the movements of scenery and equipment on stage. With some systems, each time the batten is raised or lowered, the cable must be relocated by hand. A further difficulty is that the weight of the cable extending to the batten is variable, depending upon the height of the batten above the stage. This variable addition to the weight of the batten makes it difficult to provide a counterweight to the batten that is satisfactory at all times.

The present invention avoids the above difficulties by providing means for supplying electricity to the batten through a cable that is attached to a junction box above the batten and near the stage ceiling. To provide the varying lengths of cable that are required as the batten is moved, the cable is wound upon a reel which is located near the junction box. This reel automatically takes up any slack in the cable as the batten is raised toward it, and unwinds the cable again as the batten moves downwards. In the past, a disadvantage of using reels for electrical cables has been that they have necessitated the use of electrical slip rings. This becomes a particular problem in theatrical lighting, where the cables often contain as many as 32 conductors, each requiring a separate slip-ring. Reels made in accordance with the present invention require no slip-rings. A single, continuous cable extends through the reel, connecting the movable batten directly to the fixed junction box.

As mentioned above, it is desirable, when dealing with a counterweighted batten, that the electrical cable does not introduce an uncompensated variable element into the weight of the batten. The present invention provides means for compensating for the variations in the weight of the suspended portion of the electrical cable.

Figure 2:
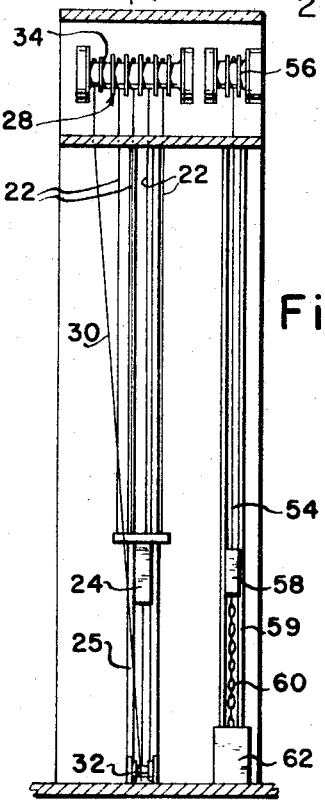
Figure 6:
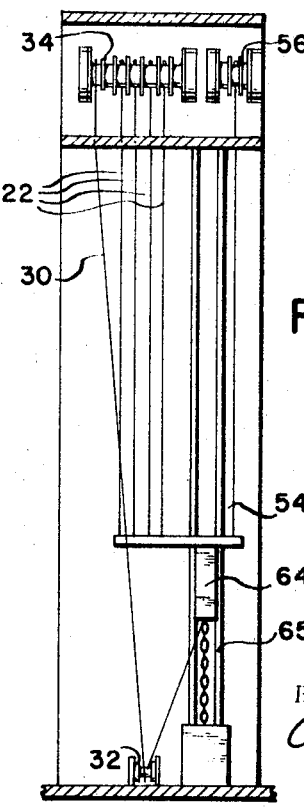

In the drawings:
FIG. 1 is a rear elevation of a stage employing one embodiment of the invention in its lighting apparatus;
FIG. 2 is a cross-sectional side view, taken along the line 2—2 in FIG. 1;
FIG. 3 is an enlarged rear elevation of the reel shown in FIG. 1, with the grid shown in cross-section;
FIG. 4 is a side elevation of the reel shown in FIG. 3, with the grid shown in cross-section;
FIG. 5 is a plan view of one of the sets of cable guide rollers shown in FIGS. 3 and 4;
FIG. 6 is a view similar to FIG. 2 of another embodiment of the invention; and
FIG. 7 is a view similar to FIG. 4 of another embodiment of the invention.

The stage shown in FIG. 1 includes a floor 2, side walls 3 and 4, a ceiling 6 and a front wall 8. The front wall contains a proscenium opening 10 through which the audience views the play. The size of the proscenium opening is reduced by curtains 12 located adjacent its side and top edges. Scenery is frequently used in place of these curtains or in addition to them, and the arrangement of the curtains and scenery is often changed in the course of a play, thereby changing the extent of the stage visible to the audience.

Located near ceiling 6 is a steel grid or platform 14, from which lights, curtains, scenery and other pieces of equipment are hung in the manner hereinafter described. Grid 14 contains a large number of openings. The cables, ropes and wires attached to the suspended equipment pass through these openings. The space between the top of proscenium opening 10 and grid 14 comprises a fly loft 15, most of which is not visible to the audience. For the sake of clarity, FIG. 1 shows only a single piece of equipment (a lighting batten 16) hanging from grid 14. The present invention can, however, be used to even greater advantage in more complex situations, when it is necessary to make maximum use of the space of the fly loft.

Lighting batten 16 comprises a metal bar 18, upon which a number of stage lights 20 are mounted. The batten is supported by steel cables 22, attached at one end to bar 18 and at the other to a counterweight 24. Each of the wires 22 is supported by a pulley 26, mounted on grid 14, and by a pulley 28, located near ceiling 6 and directly above the counterweight (see FIG. 2). Counterweight 24 is adapted to move vertically on a track 25 which extends from the stage floor to the grid. A loop of manila rope 30, attached at its ends to counterweight 24, extends around a pulley 32, located near the floor and a pulley 34, mounted on the same axis as pulleys 28 near the ceiling. This rope serves as the means for raising and lowering the counterweight and the batten.

When, for example, the batten is to be lowered to a position near the stage floor to facilitate the adjustment of the light, the portion of loop 30 extending over pulley 34 is used to raise the counterweight and thereby to lower the batten. The counterweight is of approximately the same weight as the batten, and there is enough friction in the system to keep it in equilibrium regardless of the level of the batten.

Electricity is supplied to the lights 20 (see also FIGS. 3 and 4) by a multi-conductor cable 36, which has one end 35 connected to the batten and the other end 37 connected to a junction box 38, mounted on grid 14. When the batten is fully raised, a large portion of cable 36 is wound on a reel 40, which is located on grid 14 and adapted to wind or unwind the cable extending to batten 18 as the batten is raised or lowered. Reel 40 comprises a pair of support brackets 42, which are rigidly mounted on grid 14, an axle 44 which is rotatably mounted on bracket 42, and three cylindrical cable drums 45, 46, and 47, which are rigidly mounted adjacent one another on axle 44, so that they can rotate only with one another and with the axle. Cable drums 45 and 46, which are side-by-side, are of approximately the same diameter. Cable drum 47, which is on the other side of drum 46, is substantially smaller than the other drums. The circumferential surface areas of the drums are defined by a series of circular metal flanges 49, which are larger than drums 45 and 46 and are integral with the drums. These flanges prevent the cable that is wound on each of the drums from slipping off of it.

Electrical cable 36 is wound on reel 40 in the following manner: The portion 33 of the cable near the end 35 connected to lighting batten 16 is wound on the large drum 46. The length of the cable on drum 46 is sufficient to allow the batten to move all the way to the stage floor when it is completely unwound from the drum. At the end of the portion wound on drum 46, the cable passes through a hole 51 in the flange 49 that separates drum 46 from the smaller drum 47. After passing through hole 51, the adjacent portion of the electrical cable is wound on drum 47 in the direction opposite to that of the cable wound on drum 46. Drum 47 has as many windings of cable as drum 46, but, because it is smaller, it contains fewer feet of cable. The portion of the cable adjacent the end 37 and extending from drum 47 to junction box 38 passes through openings in grid 14 and forms a loop 52 below the grid. As batten 16 is lowered, its weight and motion turns the reel to unwind cable 36 from drum 46 (see the broken line showing in FIG. 1). At the same time, the turning of the reel also unwinds cable from drum 47, increasing the size of loop 52, the difference in the sizes of the drums makes loop 52 extend a shorter distance and prevents the bottom of the loop from dropping below the level of the batten at any time. To protect the cable passing through grid 14 from the abrasive effect of rubbing against the grid, each of the openings in the grid through which the cable passes is defined by four freely rotatable rollers 70.

The rewinding of the electrical cable upon the reel when the batten is raised is accomplished by a steel wire cable 54, which is wound on drum 45 in the opposite direction from the cable winding on drum 46. Wire cable 54 passes over pulley 56 (see FIG. 2) and is attached to a small counterweight 58 on a track 59. Thus, as the batten is raised, the force of counterweight 58 on wire cable 54 turns the reel and rewinds cable 36 on drums 46 and 47. To account for the varying weight of the suspended portions of cable 36, a length of heavy chain 60 is attached to the bottom of counterweight 58 and is piled in a box 62, located beneath the counterweight. When the batten is fully raised, counterweight 58 is just above the pile of the chain in the box. As the batten is lowered, counterweight 58 rises, and a length of chain hangs from the counterweight to the top of the pile. The length of the suspended chain at all times is substantially equal to the distance from the grid to batten and, therefore, to the length of cable 36 that has been suspended to reach the lowered batten; and, it is also proportioned to the length of loop 52, suspended from drum 47. Thus, the length of the suspended chain is always in fixed proportion to the total length (and therefore the weight) of the proportions of cable 36 that are suspended from the reel. Cable loop 52 increases and decreases proportional to the length of cable portion 33 so as to increase slightly the required counterbalancing effects. The weight of the chain per foot is such that, when the batten is being lowered, the total moment of the weight of the counterweight increases as the total moment of the weights of the suspended electrical cables does.

FIG. 6 shows a modification of the arrangement described above in which a single counterweight is used both to support batten 16 and to turn reel 40. The counterweight 64 is equal to the sum of counterweights 24 and 58 in the system previously described. In the embodiment of FIGURE 7, the counterweight assembly is replaced by an electric motor 72 which is connected to drive the reels through a V-belt assembly 74, comprising a pair of V-belts and sheaves mounted respectively upon the motor shaft and the reel. Motor 72 is reversible and is provided with controls so that it may be operated selectively to turn the reels to wind and unwind the cable.

The present invention avoids the difficulties previously encountered in supplying electric current to suspended light battens, and it creates no additional problems. It permits rapid positioning of the batten at any level, without the need of manual adjustments. The electrical cable occupies only the free space directly above the batten, and it does not interfere with other stage equipment or become visible to the audience. Thus, it permits maximum use of the stage and fly loft areas. Because of the automatic adjustments of the counterweight system, this invention allows for great accuracy in counterweighting the batten, regardless of its position. Furthermore, the invention dispenses completely with the need for the use of slip-rings, providing, instead a single, continuous cable connecting the stationary junction box with the moving batten.

The foregoing description is intended only as an illustration of the invention. It is contemplated that there can be many other embodiments of the invention and that the usefulness of the invention is not limited to the field of theatrical lighting.

What is claimed is:

1. In stage lighting equipment, the combination of, a movable electric light assembly, means to move said light assembly vertically through a range of positions above the stage, a flexible electrical cable to supply electricity to said light assembly and having one end electrically connected thereto, stationary means positioned above the normal zone of movement of said assembly and connected to the other end of said cable, a reel assembly having two cable-winding reel portions which are mounted to rotate together, said cable having two spirally-wound portions and an interconnecting portion therebetween, said spirally-wound portions being wound respectively upon said two reel portions, one of said spirally-wound portions of said cable being wound in one direction from said interconnecting portion around its reel portion and the other of said spirally-wound portions of said cable being wound in the opposite direction around its reel portion whereby the rotation of said reel assembly in one direction unwinds both of said spirally-wound portions to simultaneously increase the lengths of the cable portions extending from said reel assembly respectively to said stationary means and said light assembly, and means to rotate said reel assembly simultaneously with the vertical movement of said light assembly.

2. Stage lighting equipment as described in claim 1 wherein said light assembly is a light batten and said means to move said light assembly is a counterweight system, and wherein said means to rotate said reel assembly is a counterweight means interconnected with said counterweight system.

3. A system as described in claim 2 wherein said counterweight means includes a cable counterbalancing chain which is drawn from a rest position simultaneously with the downward movement of said light batten.

4. A system as described in claim 1 wherein said means to rotate said reel assembly comprises a reversible electric motor and drive means mechanically connecting said motor and said reel assembly.

5. Stage lighting equipment as described in claim 1 wherein said reel portions of said reel assembly are of different diameters with the larger diameter having thereon said spirally-wound portion of said cable which is nearer to the end of said cable connected to said light assembly.

References Cited

UNITED STATES PATENTS

| | | | |
|---|---|---|---|
| 435,368 | 8/1890 | Robb | 240—69 X |
| 507,019 | 10/1893 | Lucia | 242—86.1 |
| 1,055,020 | 3/1913 | Camph | 240—69 |
| 1,510,399 | 9/1924 | Hauck | 240—69 |
| 2,518,072 | 8/1950 | Rushworth | 242—107.1 |
| 2,926,865 | 3/1960 | Humphreys | 242—107.13 |

NORTON ANSHER, Primary Examiner

A. MATHEWS, Assistant Examiner

U.S. Cl. X.R.

240—69; 242—107.13